US008343266B2

United States Patent
Grando et al.

(10) Patent No.: US 8,343,266 B2
(45) Date of Patent: Jan. 1, 2013

(54) FILTERING DEVICE FOR FILTERING GASEOUS FUELS IN SYSTEMS FOR SUPPLYING GAS TO INTERNAL COMBUSTION ENGINES

(75) Inventors: Maurizio Grando, Cassola (IT); Guido Gritti, Padova (IT); Enrico Toniolo, Vicenza (IT); Sandro Martini, Vicenza (IT); Carlo Segato, Villafranca Padovana (IT)

(73) Assignee: Lovato GAS S.p.A., Vincenza (IT)

( * ) Notice: Subject to any disclaimer, the term of this patent is extended or adjusted under 35 U.S.C. 154(b) by 673 days.

(21) Appl. No.: 12/299,311

(22) PCT Filed: Jan. 19, 2007

(86) PCT No.: PCT/EP2007/000452
§ 371 (c)(1),
(2), (4) Date: Jun. 14, 2009

(87) PCT Pub. No.: WO2007/128356
PCT Pub. Date: Nov. 15, 2007

(65) Prior Publication Data
US 2009/0282986 A1 Nov. 19, 2009

(30) Foreign Application Priority Data
May 9, 2006 (IT) .............................. PD2006A0179

(51) Int. Cl.
*B01D 46/00* (2006.01)
(52) U.S. Cl. ......... 96/421; 96/420; 55/385.3; 123/198 E
(58) Field of Classification Search ................. 55/385.3; 96/420, 421; 123/198 E
See application file for complete search history.

(56) References Cited

U.S. PATENT DOCUMENTS

| 5,972,075 | A | * | 10/1999 | Fukuda et al. ..................... 95/15 |
| 6,041,765 | A | | 3/2000 | O'Neill et al. |
| 6,390,075 | B1 | | 5/2002 | Yamazaki |
| 6,662,788 | B2 | * | 12/2003 | Nist .............................. 123/525 |
| 6,889,664 | B2 | * | 5/2005 | Worth et al. .................. 123/494 |
| 7,428,843 | B2 | * | 9/2008 | Prock .............................. 73/700 |
| 2002/0083932 | A1 | | 7/2002 | Ishikawa et al. |
| 2003/0192513 | A1 | | 10/2003 | Nist |

FOREIGN PATENT DOCUMENTS

| FR | 2855852 A1 | 12/2004 |
| JP | 9-228897 A | 9/1997 |
| JP | 2001234813 A | 8/2001 |

OTHER PUBLICATIONS

International Search Report and Written Opinion in related PCT application PCT/EP2007/000452.

* cited by examiner

*Primary Examiner* — Robert Clemente
(74) *Attorney, Agent, or Firm* — Kristina Castellano; CASTELLANO PLLC

(57) ABSTRACT

There is described a filtering device (1) for systems for supplying gas to internal combustion engines, comprising, integrated in the device, sensor means (10, 11, 12) for detecting the pressure and temperature of the gas being injected into the engine as well as the pressure at the inlet manifold of the engine.

13 Claims, 4 Drawing Sheets

ására, in addition to
involving higher overall costs for manufacture and greater
complexity of the layout of the pipes and electrical connec-
FILTERING DEVICE FOR FILTERING GASEOUS FUELS IN SYSTEMS FOR SUPPLYING GAS TO INTERNAL COMBUSTION ENGINES

CLAIM FOR PRIORITY

This application is a U.S. National Stage Application of PCT/EP2007/000452 filed on Jan. 19, 2007, claiming priority to Italian application PD2006A000179 filed May 9, 2006, the contents of both of which are incorporated herein by reference.

TECHNICAL FIELD

The present invention relates to a filtering device for systems for supplying gas to internal combustion engines, in accordance with the features set out in the preamble of the main claim.

TECHNOLOGICAL BACKGROUND

Filtering devices of the above-mentioned type are typically inserted in the gas supply system of the engine between a pressure reducing valve and a set of electrically controlled injectors, to which the gas is supplied at pressure values (produced by the reducing valve) which are normally close to atmospheric pressure (for naturally aspirated engines) or a few bar (for injection type engines). These filtering devices, which are typically provided with cartridge type filtering elements, are arranged upstream of the set of electrically controlled injectors for the protection thereof in order to remove any impurities from the combustible gas.

In known systems for supplying gas to engines, in order to obtain correct electronic management of the fuelling, it is necessary to acquire a series of signals, the most relevant of which are the gas injection temperature and pressure, in the set of injectors, the absolute pressure present in the engine inlet manifold, the signal relating to the rotational revolutions of the engine and the supply times of the injectors. In relation to the above-mentioned pressure and temperature signals, a first known solution provides for the use of distinct and separate sensors which are mutually independent. One example of such a construction provides for the individual injection temperature and pressure sensors to be positioned in the set of injectors and the sensor for absolute pressure at the manifold to be positioned in the electronic management module, in which the signal for the pressure present in the manifold is introduced. One of the greatest limitations encountered in this known solution relates to the fact that the above-mentioned sensors involve separate and distinct components which makes the installation thereof more complex, in addition to involving higher overall costs for manufacture and greater complexity of the layout of the pipes and electrical connections (in order to supply the sensors and acquire the signals from the respective transducers) provided for connecting the entire system. The higher level of complexity and difficulty is obviously reflected in the steps for installing and maintaining the system, with the additional risk of incorrectly installing the components.

In order to partially overcome the disadvantages set out, the prior art has provided technical solutions in which the gas injection pressure sensor and the sensor for the absolute pressure at the manifold are combined in a single component; however, such solutions only partially solve the above-mentioned problem.

There are also known solutions in which the injection temperature and pressure sensors are combined in a single component which is able to be associated, by means of suitable mutual fixing means, with the body of the gas filtering device provided in the system. This solution also has some limitations, including the fact that it is still necessary to provide a separate and distinct sensor for detecting the pressure at the manifold, which in some known solutions is accommodated in the electronic management module of the system, also involving the limitations set out above.

DISCLOSURE OF THE INVENTION

The main object of the present invention is to construct a filtering device for systems for supplying gas to internal combustion engines that is structurally and functionally configured to overcome the limitations set out above with regard to the known prior art.

This object and others, which will be appreciated more clearly from the following description, are achieved by the present invention by means of a pressure type filtering device in accordance with the appended claims.

BRIEF DESCRIPTION OF THE DRAWINGS

The features and advantages of the invention will be appreciated more clearly from the detailed description of one preferred embodiment, illustrated by way of non-limiting example with reference to the appended drawings, in which.

PREFERRED EMBODIMENT OF THE INVENTION

With reference to the Figures mentioned, a filtering device for filtering the gaseous fuel in systems for supplying gas to internal combustion engines constructed in accordance with the present invention is generally designated 1.

In the present context, the term gas is intended to refer to any fuel which is used for automotive traction and which, under the operating conditions relating to the engine injection temperature and pressure, is in the gas phase, irrespective of the fact that it is, in the storage tank, in the gas or liquid phase. One example of a gas in the first case is methane and one example of a gas in the second case is LPG.

It should naturally be understood that the inventive concept of the present invention is also applicable to systems supplying one or other of the gaseous fuels set out or any other different fuel.

Figure 4:
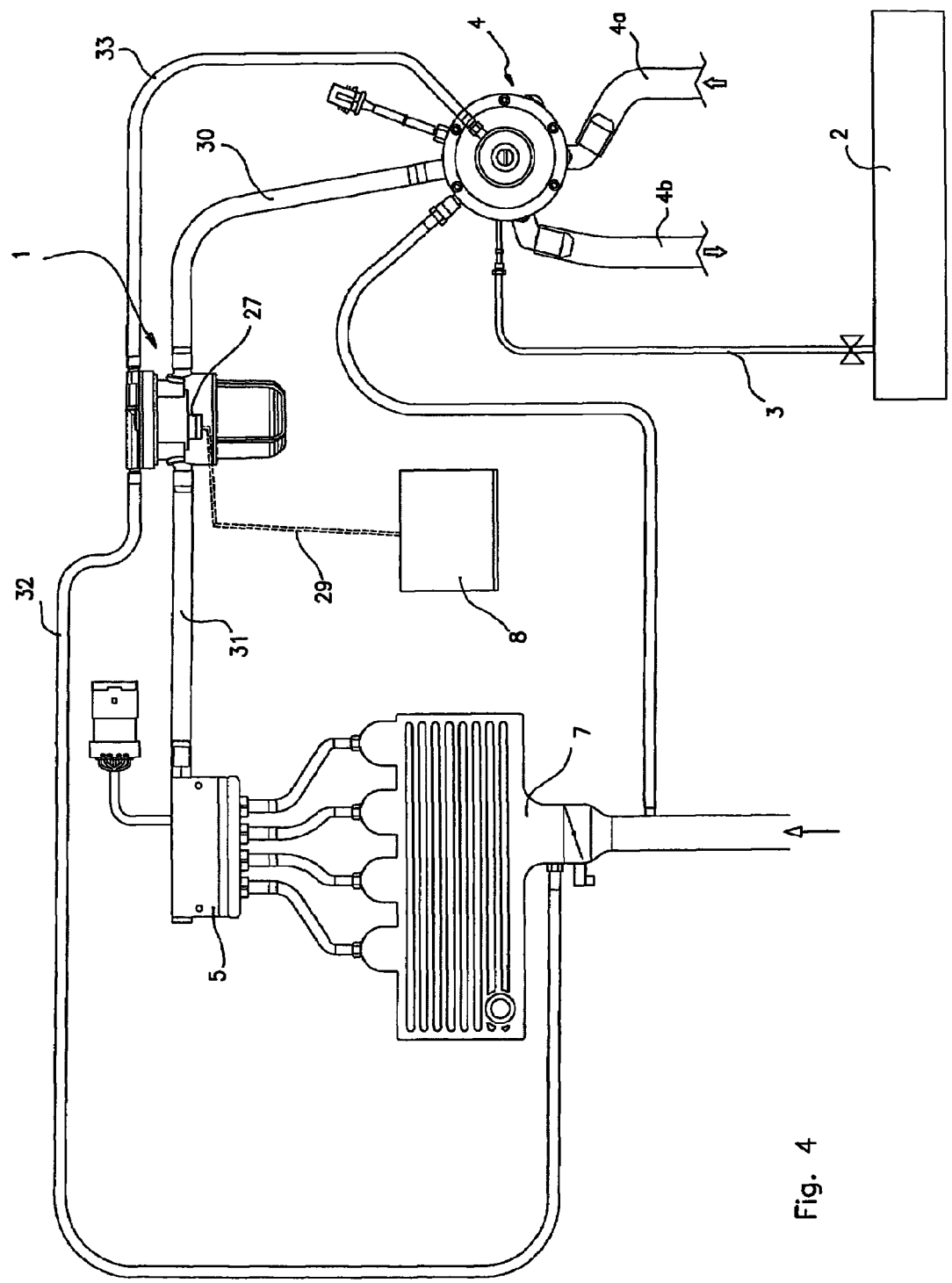
FIG. 4 is a schematic view of a system for supplying gas to internal combustion engines provided with the device according to the invention.

The filtering device 1 is inserted in the system for supplying combustible gas to an internal combustion engine, and is merely indicated schematically in FIG. 4. The system generally comprises a storage tank 2 for the combustible gas, from which the gas is dispensed, by means of a pipe 3 at high pressure (in which there are provided cut-off valves which are known per se), to a pressure reduction device 4. By way of the pressure reduction device 4, which can also act as a gas vaporiser (by the heating brought about by the passage of engine cooling water via pipes 4a, 4b), the gas is brought to a preselected pressure value (in the gas phase) in order to supply a set of electrically controlled injectors 5 which are able to provide the gas required by the engine for its operation. The filtering device 1 which is able to filter the gas prior to injection into the engine cylinders is positioned in the gas supply line between the set of injectors 5 and the pressure reduction device 4.

To this end, the filtering device 1 is provided with a filtering element 6, for example, of the replaceable cartridge type.

The engine inlet manifold is further designated 7 and is schematically illustrated. The absolute inlet pressure is measured therein, which value is used to control the pressure difference imposed in the pressure reduction device 4, as will appear more clearly below. In order to monitor the control of the supply system, there is further provided, in the system, an electronic management module designated 8 which typically includes an electronic microprocessor system, which processes in real time the signals from a series of sensors, calculating the optimum gas injection times on the basis of the operating conditions of the engine.

Among the relevant sensors, for the purposes of the present invention, the system comprises a sensor means 10 for detecting the pressure of the gas being injected into the engine, a sensor means 11 for detecting the gas injection temperature as well as a sensor means 12 for detecting the absolute pressure in the inlet manifold 7 of the engine.

According to a main feature of the invention, all three sensor means 10, 11 and 12 are integrated in the filtering device 1.

In greater detail, the filtering device comprises a main gas filtering chamber 13, in which the pressure and temperature sensor means 10, 11 are active, and a separate and distinct auxiliary chamber 14, which is independent of the chamber 13 and in which the pressure sensor 12 is active. The main chamber 13 is defined in a body 15 of the filtering device, to which a casing 16 for housing the cartridge 6 of the filter is removably connected (by means of a screw/nut connection). An inlet opening and an outlet opening for the flow of gas are delimited in the body 15; they are designated 17 and 18 and are defined at gas inlet and outlet pipe unions 17a and 18a, respectively. A first gas passage 17b extends from the inlet pipe union 17a in communication with a seat 19 for receiving the cartridge, downstream of which a second gas passage 18b extends, in communication with the seat 19, as far as the outlet opening 18a. The pressure and temperature sensors 10, 11 are arranged in the portion of the chamber downstream of the cartridge 6 of the filter, and are advantageously active with their respective sensitive detection elements inside the passage 18b.

In this regard, a pair of through-holes 20a, 20b open in the gas passage 18b and communicate with an internal cavity 21 of the device which is interposed between the chambers 13 and 14. The sensitive elements of the sensors 10, 11 are fitted in the holes, with gas-tight securing means constructed by means of one or more sealing rings, generally designated 20c. An electronic board which comprises a circuit assembly 22 for supplying and controlling the above-mentioned sensor means is received in the cavity 21, as will be described in detail below. The circuit assembly 22 is constructed in a printed circuit, on which the sensors 10, 11 and the sensor 12 are mounted. The sensitive measuring element of the sensor 12 is similarly mounted, with gas-tight securing by means of sealing rings 23a, in a through-hole 23 which places the cavity 21 in communication with the auxiliary chamber 14. The sensor 12 is preferably associated with the printed circuit of the circuit assembly at the opposite side to the sensors 10 and 11, although a different position may also be provided.

There are defined, in the auxiliary chamber 14, gas inlet and outlet openings which are designated 24 and 25, and which are defined in the region of a gas inlet pipe union 24a and gas outlet pipe union 25a, respectively. A first gas pipe 24b extends from the inlet pipe union 24a in communication with the chamber 14, from which a second gas pipe 25b extends as far as the outlet opening 25a.

Figure 2:
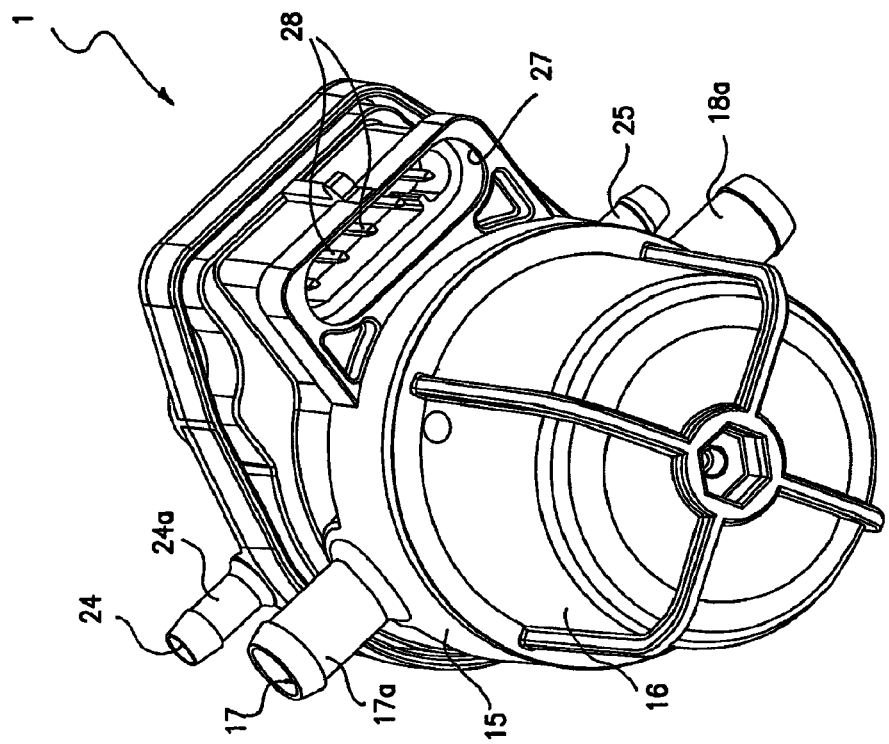
FIGS. 1 and 2 are perspective views of a filtering device constructed according to the present invention.
Figure 1:
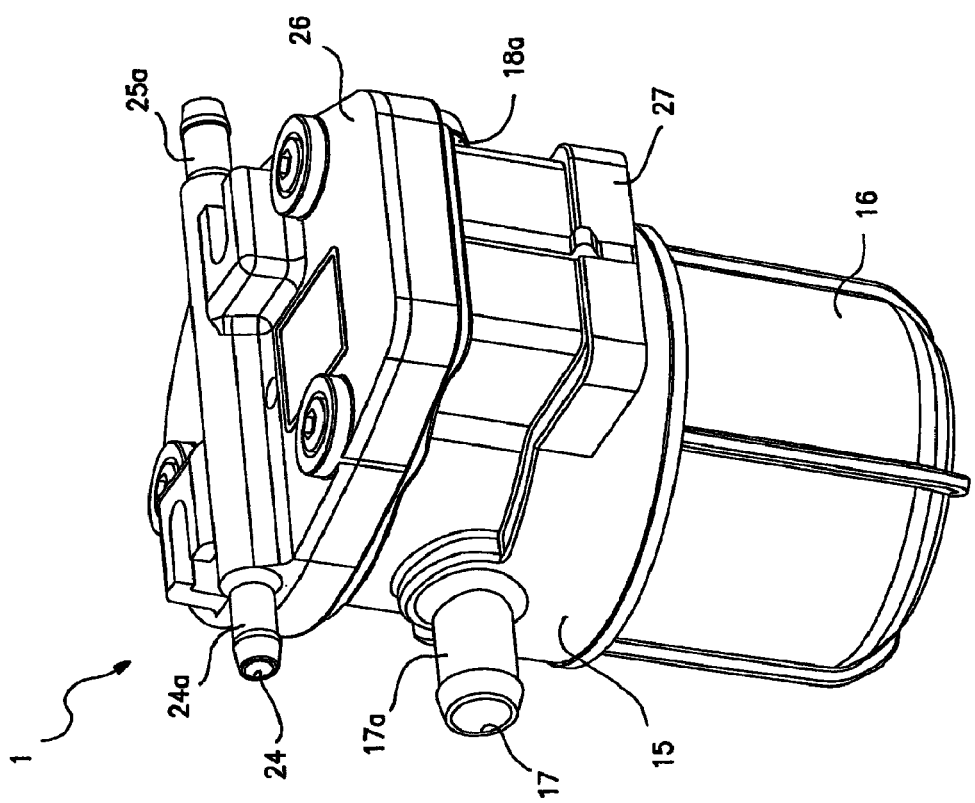
Figure 3:
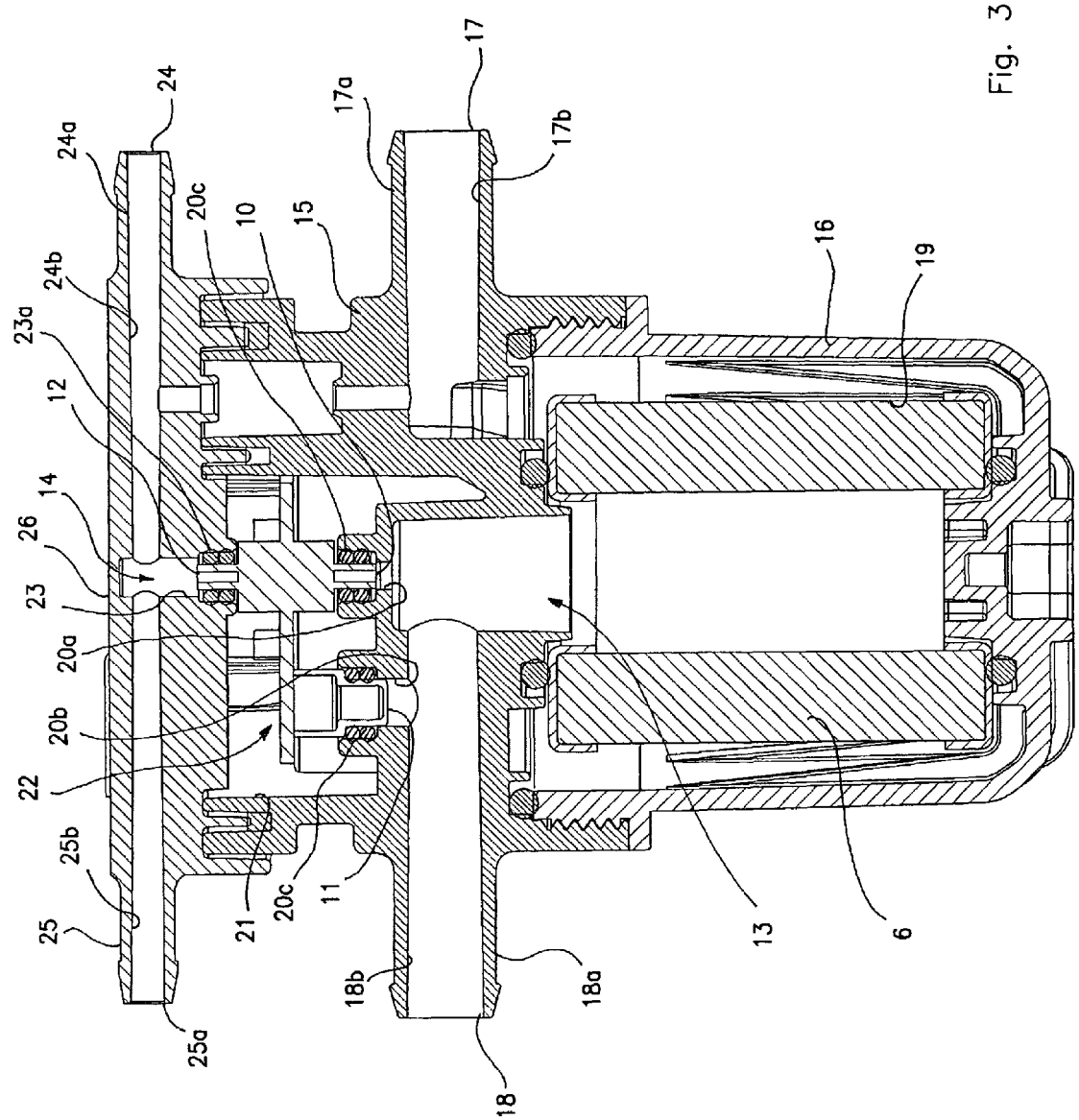
FIG. 3 is an axial section of the device of FIG. 1.

The pipe unions 17a, 18a and the pipe unions 24a, 25a preferably extend axially with mutual alignment, as shown in FIG. 3. The axial development directions of each pair of inlet/outlet pipe unions of the chambers 13, 14 are further parallel with and spaced apart from each other.

There is further provision for the auxiliary chamber 14 to be able to be constructed in an element 26 which is structurally independent of the body 15 but which can be joined thereto in a detachable manner so that the element 26 and the body 15 together delimit the cavity 21 for receiving the circuit assembly. For the electrical power supply and the transmission of the pressure and temperature signals acquired by the sensors, the filtering device is provided with a single connector 27 including respective electrical terminals, generally designated 28, which are electrically connected to the control circuit assembly by means of electrical conductors which are formed in the printed circuit. The connector 27 is advantageously integrally constructed with the body 15 of the filter and is in the form of a socket type connector suitable for connection to a corresponding jack type connector (not illustrated) in order to bring about the electrical connection with respect to the management module 8 by means of a wire 29 having a plurality of strands, schematically illustrated in the Figures.

In the example described, there is provision for the connector 27 to have five terminals 28, two directed towards supplying the board of the circuit assembly with electricity and three provided for the corresponding signals acquired by the sensors 10, 11 and 12 integrated in the device 1, with a different number of terminals naturally being able to be provided in accordance with various specific requirements, but it remaining intended that the terminals provided are still integrated in a single connector which is integrally constructed with the main body of the filtering device, for example, by means of a technique for moulding plastics material.

Again with reference to the drawing of the supply system illustrated in FIG. 4, a tube suitable for connecting the inlet pipe union 17a to the inlet of the pressure reduction device 4 is designated 30, and a tube suitable for connecting the outlet pipe union 18a from the chamber 13 to the set of electrically operated injectors 5, to which the gas for being injected into the engine cylinders is conveyed, is designated 31. A tube 32 is further provided in order to connect the pipe union 24b of the chamber 14 to the inlet manifold of the engine and another tube 33 is provided for connecting the pipe union 25 to the pressure reduction device 4 in such a manner that the signal relating to the pressure present in the manifold is conveyed to the reduction device and is measured in the auxiliary chamber 14 by means of the sensor 12.

During operation, it is provided that, by means of the signal of the absolute pressure in the inlet manifold, measured by the sensor 12 integrated in the filtering device and by means of the injection pressure and temperature signals, also measured by means of the sensors 10, 11 integrated in the filter, the management module establishes the correct measure of gas to be supplied to the set of injectors by calculating the optimum gas injection times on the basis of the operating conditions of the engine.

Figure 5:
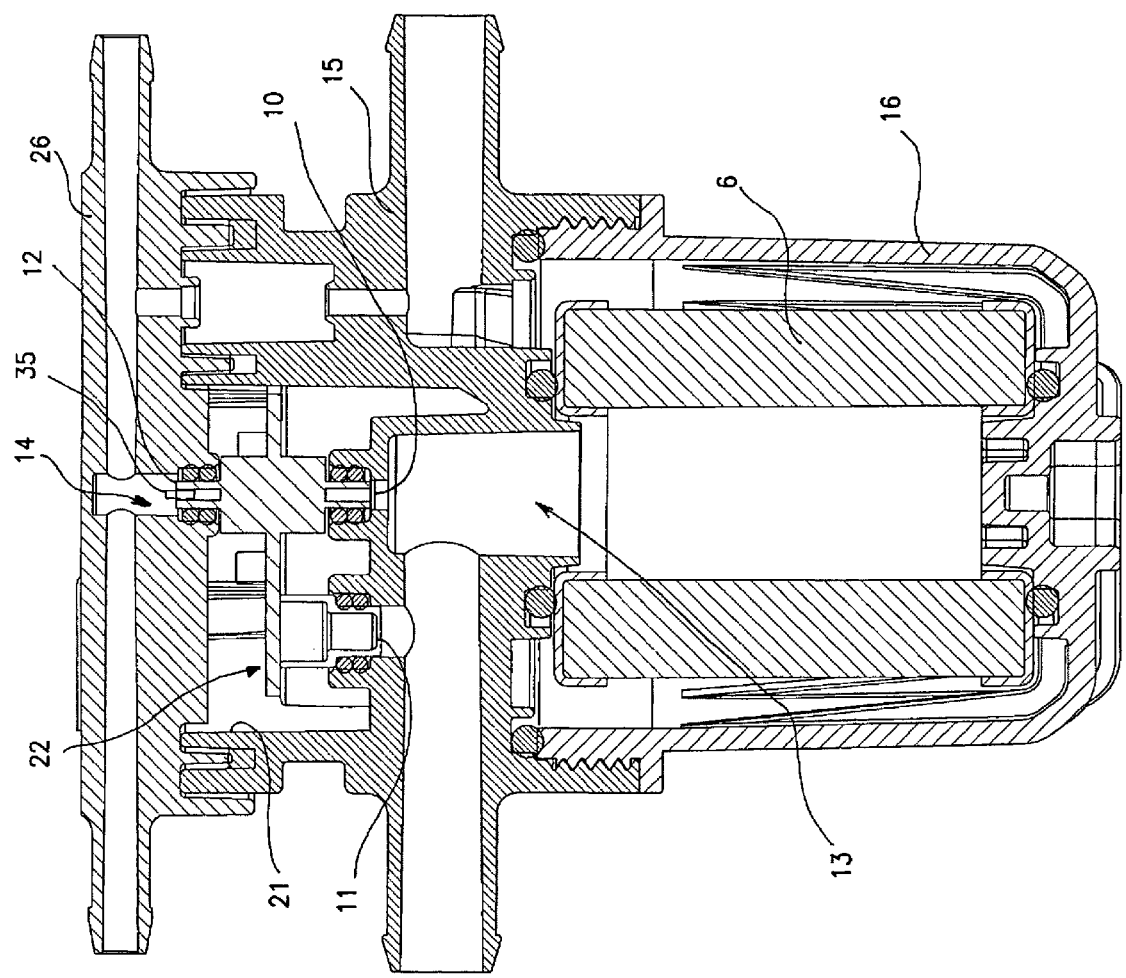
FIG. 5 is a view of a variant of the invention corresponding to that of FIG. 3.

In a variant of the invention, illustrated in FIG. 5, there is provision for another sensor means 35 to be integrated in the filtering device 1 for measuring the temperature of air present in the inlet manifold of the engine. This sensor may advantageously be integrated in the pressure sensor 12 in order to be active with its sensitive measuring element in the auxiliary chamber 14. In that case, the circuit assembly 22 is provided for acquiring the value of that temperature and for transmitting it to the management module 8. An additional terminal 28 may optionally be provided for that temperature signal in the connector 27.

The invention thus achieves the objects set out by overcoming the limitations of the prior art mentioned and bringing about a number of advantages over the known solutions.

A main advantage involves the fact that the device of the invention does not need to be provided with any additional components for the sensors of the supply system, since they are integrated in the filtering device, with a resultant reduction in costs and simplification of the installation and maintenance of the system. There is further advantageously obtained a simplification of the electrical and pneumatic connections relating to the sensors and the transmission of the signals measured to the management module. That simplification further involves a lesser burden in terms of the costs of installing the system in addition to reducing the risk of mistakes when the components provided are fitted in the system in relation to known solutions.

The invention claimed is:

1. A filtering device for systems for supplying gas to internal combustion engines, comprising:
   sensor means integrated in the device for detecting pressure and temperature of the gas being injected into an engine and pressure of air at an inlet manifold of the engine;
   a main gas filtering chamber, wherein the sensor means for detecting the pressure and temperature of gas being injected into the engine are active, and
   a second auxiliary chamber for passage of the air, which second auxiliary chamber is separate from and independent of the main gas filtering chamber, wherein the sensor means for detecting the pressure of the air at the inlet manifold of the engine are active;
   wherein the main gas filtering chamber comprises a seat for receiving a cartridge type filtering element; and
   wherein the sensor means for detecting the pressure and temperature of gas being injected is provided in a portion of the main chamber that extends downstream of the filtering element, with respect to a direction of flow of the gas inside the device.

2. The filtering device according to claim 1, wherein the main gas filtering chamber comprises inlet and outlet openings for flow of gas, in order to connect the main gas filtering chamber with fluid communication to an inlet of a pressure reduction device and a set of electrically operated injectors for injecting the gas into the engine.

3. The filtering device according to claim 1, wherein the second auxiliary chamber comprises respective inlet and outlet openings for the flow of gas in order to connect the auxiliary chamber with fluid communication to the inlet of a pressure reduction device and the inlet manifold of the engine.

4. The filtering device according to claim 1, wherein there are provided, for each of the chambers, in a region of inlet and outlet openings, respective pipe unions which extend axially with mutual alignment.

5. The filtering device according to claim 4, wherein axial development directions of the pairs of inlet and outlet pipe unions of the respective chambers are parallel with and spaced apart from each other.

6. The filtering device according to claim 1, comprising a circuit assembly for supplying and controlling the sensor means integrated in the device.

7. The filtering device according to claim 1, comprising, integrated in the device, a single connector element including respective terminals for supplying electricity and acquiring signals for the sensor means, the terminals being electrically connected to a circuit assembly for supplying and controlling the sensor means by means of electrical conductors.

8. The filtering device according to claim 1, wherein an auxiliary chamber is formed in an element which is able to be removably fixed in a main body of the filtering device, in which a main filtering chamber is received.

9. The filtering device according to claim 8, wherein a receiving gas-tight cavity of a circuit assembly is defined by both a main body of the device and an element which is removably fixed to the body.

10. The filtering device according to claim 1, comprising, integrated in the device, an additional sensor means for detecting temperature present in the inlet manifold of the engine.

11. The filtering device according to claim 1, wherein a sensor means for detecting the temperature at the inlet manifold is active in the second auxiliary chamber.

12. The filtering device according to claim 11, wherein the sensor means for detecting the temperature at the inlet manifold of the engine is integrated in the sensor means for detecting the pressure at the manifold.

13. A filtering device for systems for supplying gas to internal combustion engines, comprising
   sensor means integrated in the device for detecting pressure and temperature of the gas being injected into an engine and pressure of air at an inlet manifold of the engine;
   comprising a circuit assembly for supplying and controlling the sensor means integrated in the device;
   wherein the circuit assembly is received in a cavity which is interposed between a main gas filtering chamber and a second auxiliary chamber and which opens therein by means of holes which are able to receive sensitive elements of the sensor means, respectively, with gas-tight securing of elements in the corresponding holes.

\* \* \* \* \*